United States Patent [19]
Aronsohn

[11] 3,955,885
[45] May 11, 1976

[54] EYEGLASS SUPPORT DEVICE

[76] Inventor: Richard B. Aronsohn, 638 Woodruff Ave., Los Angeles, Calif. 90024

[22] Filed: Mar. 31, 1975

[21] Appl. No.: 563,483

[52] U.S. Cl. ................................................. 351/155
[51] Int. Cl.² ........................................... G02C 3/00
[58] Field of Search ..................... 351/41, 155; 2/11

[56] References Cited
UNITED STATES PATENTS

| | | | |
|---|---|---|---|
| 3,758,202 | 9/1973 | Chunga | 351/155 X |
| 3,832,043 | 8/1974 | Usdan | 351/155 |

*Primary Examiner*—Paul A. Sacher
*Attorney, Agent, or Firm*—Fraser and Bogucki

[57] ABSTRACT

An eyeglass support device is disclosed in which a pair of frictionally restraining clamps support lower peripheral regions of the eyeglasses while keeping the bridge of the eyeglasses substantially free from the wearer's nose to avoid pressure following surgery or injury. The substantial eyeglass weight depending from the wearer's ear-temple junctures is transmitted to the wearer's cheekbones, shifting the eyeglasses outwardly from the nose without materially affecting the optical axis. In one example, a cheek pad coupled T-bar stem threaded in the clamp portion adjusts the distance between the eyeglass periphery and the cheek surface; a cheek pad pivotably coupled to the stem is further adjustable to conform to the wearer's cheek. In another example, the device comprises a swivelable ball joint coupling the clamp to the cheek pad. In a further example, the eyeglasses are supported by T-shaped elements each comprising a crosspiece having a cheek contacting surface and an extending stem terminating in partially extensible retaining jaws for gripping the lower rim of a lens structure.

24 Claims, 10 Drawing Figures

EYEGLASS SUPPORT DEVICE

BACKGROUND OF THE INVENTION

Rhinoplasty is the most common operation performed by the cosmetic surgeon. A large percentage of rhinoplasty patients wear eyeglasses framed or unframed whose weight is primarily supported by the nose bridge bearing against the bridge or nose pad of the eyeglasses. Because of the swelling that occurs along the bridge following surgery, the weight of the glasses against the swollen skin, which in its natural state is sensitive to pressure, can lead to redness, atrophy and also dents in the skin. The physical discomfort alone involved in wearing eyeglasses following surgery or injury often limits their use under these conditions.

Various methods have been employed to take pressure of the eyeglasses off the nose. One such technique is to apply tape around the eyeglass bridge and attach the tape to the forehead, thus raising the eyeglasses off the nose. This technique has been objectionable since it is unattractive, the perspiration produced by the skin loosens the tape and the eyeglasses slip down necessitating repetition of the procedure and, moreover, causes problems with the refractive error of the patient. Elevating the eyeglasses causes the patient to look below the optical centers of his lenses, producing a visual disturbance and vertical imbalance in his refractive error. This also produces an equilibrium disturbance and interferes with the performance of tasks. Another problem affects the older bifocal wearer who must look through the bottom or reading portion of his lenses, severely affecting distance vision.

With the elderly and others, where there is atrophy and thinness of the nasal bridge skin, the need for eyeglasses which will not contact the nasal bridge is apparent. The elderly have a specific problem in that the nasal skin thins out and tends to gravitate. The nasal pads of ordinary eyeglasses pull the lax skin downward on the bridge creating folds of skin that are cosmetically unattractive. Younger users often are concerned with the same problem.

The need for eliminating contact between the nose and the bridge of the eyeglasses also exists when the nasal pad area becomes inflamed due to the pads constant pressure and rubbing over the oily area. Holding the eyeglasses slightly away from the nose allows the irritated area to rest and still permits normal visual function for the patient. However, this can only be a temporary expedient.

A variety of attachments have been added to glasses for various purposes throughout the years. Techniques have been suggested which require use of adhesives and provide eyeglasses with abbreviated frames lacking the usual rearwardly extending arms which are normally placed on the ears adjacent the temples of the wearer. Such devices do not satisfy the presently felt need of separating the ordinary prescription eyeglasses from the nose while maintaining vertical alignment with respect to the wearer's vision. They also require that separate lenses be prepared for this particular purpose, a requirement which often is economically unacceptable. There is thus a substantial need for a very low cost device that will enable normal eyeglasses to be worn without disrupting a wearer's vision.

SUMMARY OF THE INVENTION

Eyeglass supports in accordance with this invention generally comprise a separate eyeglass engaging clamp detachably engaging the lower periphery of each lens of the eyeglasses. A separate cheek pad coupled to each clamp frictionally engages the cheekbone areas of the wearer and provides reaction forces sufficient to prevent primarily downward slippage. The eyeglasses are shifted directly outwardly from the face while being maintained in substantial vertical alignment, thereby minimizing vertical imbalance and refractive error.

In a preferred example of the eyeglass support device, a threaded stem mating with the eyeglass clamp has a short cylindrical rod normal to the stem and disposed within an off center cylindrical bearing in the cheek pad. This allows the cheek pad to pivot eccentrically about the axis of the rod to conform to contours of the wearer's cheek. Rotation of the stem also varies the depth of the threaded stem in the clamp and thereby adjusts cheek to eyeglass frame distance for variation of cheekbone depth and eyeglass frame size. A foam pad frictionally engages the wearer's cheek. The clamp preferably is of a semi-flexible extensible material to receive a wide variety of eyeglass rims.

In another example, the cheek pad is swivelable with respect to the clamp, and includes a ball joint socket. A stem coupling the grip to the cheek pad has a ball joint plug frictionally fitted in the socket, so as to at least partially rotate under force. The clamp comprises a pair of facing partially extensible jaws, each jaw having a pair of eyeglass engaging teeth. The teeth define a pair of partially bounded channels for receiving any of a wide variety of eyeglass rims.

In a further example, the eyeglass support elements are generally T-shaped and comprise a crosspiece having a cheek contacting surface and a stem extending opposite the cheek contacting surface of the crosspiece, the stem defining a rim engaging clamp. In a similar arrangement, complementary right and left eyeglass supports each comprise a stem defining a rim engaging clamp and a cheek engaging pad joined to each stem remote from the clamp at respective right and left obtuse angles.

BRIEF DESCRIPTION OF THE DRAWINGS

A better understanding of the invention may be had by reference to the following description in conjunction with the accompanying drawings, in which.

DETAILED DESCRIPTION

With reference particularly to FIGS. 1 to 7, a preferred example of an eyeglass support device in accordance with this invention comprises framed eyeglasses 10 of the conventional type, having a pair of lenses 12 interconnected in juxtaposition and side arms 14 connected to opposite end portions of the lens pair, and extending rearward adjacent the temples and over the ears of the wearer. The lenses 12 are interconnected by a bridge 16 which may include nose pad elements 18. Detachable eyeglass support units 20 are disposed adjacent the bottom peripheral region of each of the lenses 12.

Each support unit 20 comprises a clamp 22, a cheek pad 24 and a T-bar 26 interconnecting the clamp 22 and the cheek pad 24. The support units 20 are made of any suitable material, though semi-flexible high strength synthetic polymer materials such as nylon, Lexan or Delrin plastic have been found particularly suitable.

The side arms 14 of the eyeglasses 10 rest on the ear in both a partially pivotally supporting and partially frictionally restraining relationship. Without the eyeglass support units 20, a substantial part of the weight of the eyeglass 10 is normally supported by the bridge 16 or the nose pads 18 bearing on the nose of the wearer. With the support units 20, a substantial portion of the weight of the eyeglasses is transmitted from the clamps 22 through the T-bars 26 to the cheek pads 24. This weight is vectorially transmuted from the generally downwardly directed forces of the eyeglasses 10 bearing on the clamps 22 to horizontally as well as vertically directed forces acting through the cheek pads 24. Components of force normal to the cheek, in addition to the pivotal restraining forces of the side arms 14 at the ear-temple juncture, create sufficient frictional restraint to prevent the eyeglasses 10 from slipping downward despite movements of the wearer. Thus the nose pads 18 at the bridge 16 are generally prevented from contacting the nose of the wearer as the eyeglasses 10 are held in position. However, it is usually satisfactory to have the nose pads 18 lightly contact the wearer's nose, the primary weight of the eyeglasses 10 being supported by the support devices 20 avoiding substantial pressure bearing on the nose.

Figure 1:
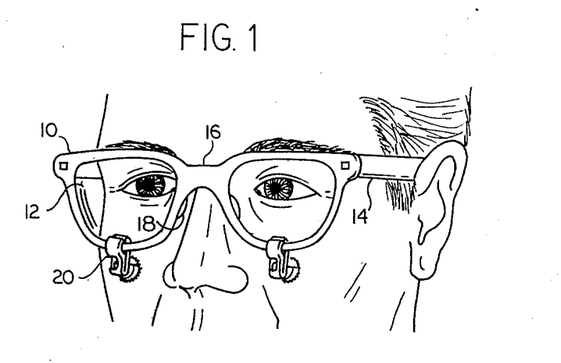
FIG. 1 is a perspective view of a preferred example of the eyeglass support device in accordance with this invention positioned on eyeglasses and showing the device in use on a wearer.
Figures 2, 3:
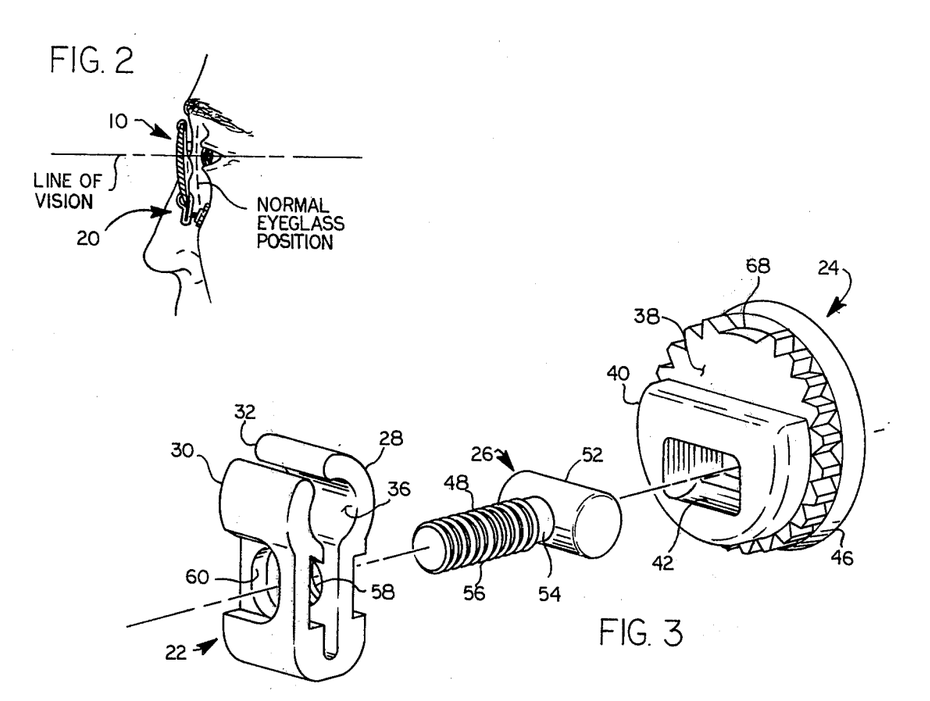
FIG. 2 is a side view of the eyeglass support device depicted in FIG. 1 and showing the manner in which the optical axis is shifted.
FIG. 3 is an exploded perspective view of the eyeglass support device depicted in FIG. 2.

As best viewed in FIG. 2, the eyeglass support device 20 advances the nominal horizontal position of the eyeglasses without materially altering the vertical nominal position of the eyeglasses. By maintaining alignment of the lenses 12 with respect to the wearer's line of vision, imbalance and refractive error are minimized. The alteration of vision caused by anterior advancement is less disconcerting to the wearer than eyeglass rotation or vertical displacement. The amount of anterior advancement is dependent upon both facial characteristics and the extent of clearance (if any) desired, and in some instances may introduce virtually no image distortion effects.

It will also be appreciated that some eyeglass users may prefer such novel eyeglass supports with the glasses in normal operating position. This may be accomplished, particularly with certain wire rim eyeglasses in which the nose pads are simply removed from the frames. Clearance is maintained between the rims of the frames and the wearer's nasal bridge by the supports without even advancing the nominal horizontal position of the eyeglasses.

The eyeglass support devices 20 are low in cost yet are suitable for use with substantially all eyeglasses. In addition, the eyeglass support devices 20 are adaptable, by way of adjustments, to substantially any combination of facial configuration and eyeglass design. Different individuals can have quite widely varying cheekbone dispositions with respect to nose and eye location. Also, there is a tendency of the cheekbones of women to be further inset than those of men. Yet, the eyeglass support devices 20 are usable on substantially any combination of eyeglass design and individual by means of adjustments to vary the cheek pad angle and by means for adjusting the clamp to cheek pad distance.

Figure 5:
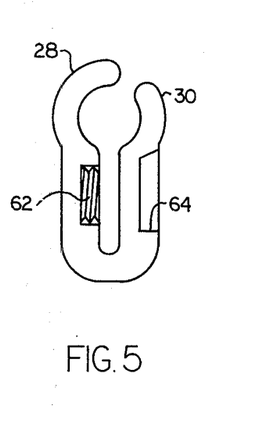
FIG. 5 is an enlarged left side view of the clamp of the device depicted in FIG. 3.

To provide virtually universal compatibility with eyeglass design, each clamp 22 is generally U-shaped and comprises a primarily fixed jaw 28 adjacent the cheek pad 24 and a resilient extensible jaw 30 further from the cheek pad 24. Each jaw 28, 30 has a substantially rounded eyeglass engaging surface 32 both for gripping the eyeglass lens and for allowing forcible extension of primarily the extensible jaw 30 in wedging relationship by the eyeglass rim or frame. The resilience of the jaws 28, 30 substantially determines the effective gripping by the clamp 22. Channel surfaces 36 on the interior facing regions of the jaws 28, 30 adjacent the eyeglass engaging surfaces 32 provide additional grip to engage eyeglass frames or peripheries as needed.

Figure 4:
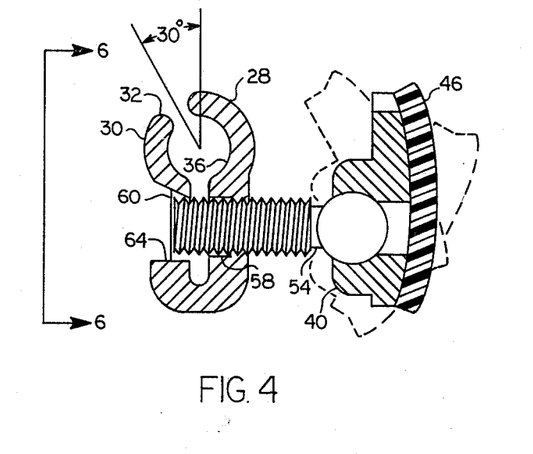
FIG. 4 is an enlarged right side sectional view of the device depicted in FIG. 2 taken along the lines 4—4.

The cheek pad 24 comprises a disc-like narrow base portion or element 38 having a low profile spherical contoured surface and a raised boss 40 opposite the contoured surface in which a bearing aperture 42 is disposed. The bearing aperture 42 comprises a pair of facing elongated rounded concave surfaces. The bearing aperture 42 has a length on the order of one-half of the diameter of the disc base 38 and is positioned off center, i.e., generally parallel to and offset from a diametral axis thereof. A rectangular opening adjacent the bearing aperture 42 extends through the narrow portion 38 of the cheek pad 24 to avoid the existence of a thin section in the molded cheek pad 24. A foam pad 46 is affixed to the round narrow element 38 opposite the rod receiving openings. The foam pad 46 bears against and conforms to the cheek surface of the wearer and enhances the frictional restraint.

The T-bar comprises a base stem 48 having a central axis passing through the stem 48 and terminating in a cylindrical crosspiece rod 52 defining an axis of rotation along the length thereof and disposed within the bearing aperture 42. The crosspiece rod 52 extends proximate the cheek supporting the cheek pad 24. This allows the cheek pad 24 to pivot about the rod 52 to adjust the cheek pad relative to the eyeglass 10. The T-bar stem 48 comprises a narrowed portion 54 adjacent the rod 52 to allow rotational clearance of the rod 52 within the bearing aperture 42 of the cheek pad 24 without stem interference. The truncated width of the raised portion 40 provides clearance for substantial rotation of the cheek pad 24 without clamp interference.

The cheek pad 24, when disposed normal to the stem 48 defines a plane which includes the round narrow element 38, disposed at an angle of approximately 30° with respect to a nominal plane passing through an eyeglass lens, the frame of which is engaged by the clamp 22 as depicted in FIG. 2.

The stem 48 comprises threads 56 mating with a threaded aperture 58 in the primarily fixed jaw 28 of the clamp 22. This allows adjustment of the cheek pad to eyeglass distance. It should be noted that other adjustable couplings between the stem 48 and the clamp 22 are contemplated within the scope of this invention. The clamp 22 has an aperture 60 on the extensible jaw 30 substantially coaxial with the threaded aperture 58 of larger diameter than the threads 56 of the stem 48 to receive the threads 56 without interference. Both the threaded aperture 58 and the aperture 60 comprise respective overlapping threaded and smooth surfaces of staggered U-shaped cavities in the jaws 28, 30 for ease of fabrication as described below.

To allow adjustment of the stem 48 in the threaded aperture 58 when the jaw 28 is in an extended position, such as when large eyeglass rims are disposed between the channel surfaces 36, the aperture 60 is slightly elongated and expands inwardly adjacent to the channel surfaces 36. The transverse width of the aperture 60 is only slightly greater than the stem thread diameter to maintain axial alignment of the stem 48, required by the staggering of threads of the aperture 58.

Figure 6:
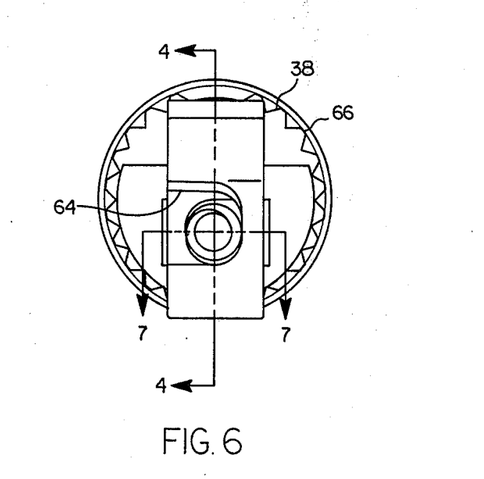
FIG. 6 is an enlarged front view of the eyeglass support device depicted in FIG. 4 taken along the lines 6—6.
Figure 7:
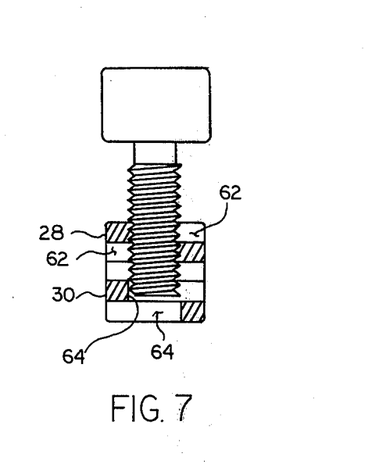
FIG. 7 is an enlarged side sectional view of a portion of the eyeglass support device depicted in FIG. 6 taken along lines 7—7.

The threaded aperture 58 is defined by a pair of opposing U-shaped cavities 62 having threaded round portions and disposed in parallel adjacent one another, transversely on the fixed jaw 28. The round portions of the cavities 62 are substantially coaxial, the U-shaped cavities 62 being disposed in overlapping relationship and the parallel sides of the cavities 62 open to opposite sides of the jaw 28. This simplifies molding of the clamp 22 by allowing the removal of dies along parallel axes.

Similarly, the aperture 60 is defined by a pair of opposing U-shaped cavities 64 having round portions and disposed in parallel adjacent one another transversely on the extensible jaw 30. The round portions are coaxial, the U-shaped cavities 64 being disposed in overlapping relationship and the parallel sides of the cavities 64 open to opposite sides of the jaw 30.

The rod 52 bearing on the bearing aperture 42 causes the stem 48 to rotate in response to rotation of the cheek pad 24 for adjusting the clamp thread depth. The eccentric disposition of the rod 52 relative to the cheek pad 24 allows enhanced variation of the placement of the pad relative to the wearer's cheek. Peripheral teeth 66 on the narrow element 38 facilitate manual rotation of the stem 48. The adhering pad 46 is disposed over in conformity to and substantially extensible with the spherical contoured surface of the narrow disc element 38, thus isolating the teeth 66 from the wearer's cheek for optimal comfort. A flattened portion 68 adjacent the teeth 66 defines the cheek pad position to enable the user to correspondingly adjust both right and left cheek pads 24 for comfort.

Figure 8:
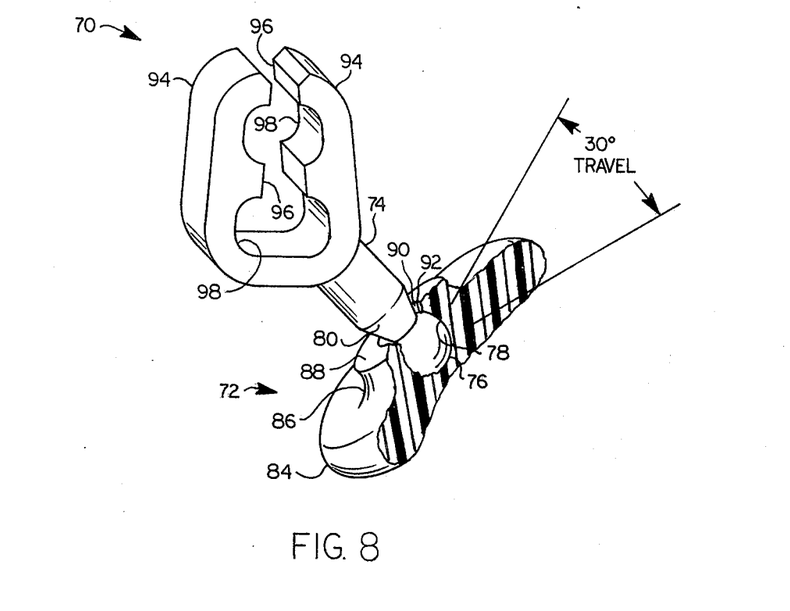
FIG. 8 is an enlarged perspective view of a different eyeglass support device in accordance with this invention.

Referring to FIG. 8, another example of an eyeglass support device in accordance with this invention comprises an eyeglass engaging clamp 70, a circular cheek pad 72 and a stem 74 swivelably coupling the circular cheek pad 72 to the clamp 70. The stem 74 is an elongated element integrally joined to and extending from the clamp 70 to an obtuse angle to a nominal eyeglass plane defined by the clamp 70 and terminating in a generally spherical ball joint plug 76. The plug 76 mates with a ball joint socket 78 defined by a spherical interior surface disposed centrally within the circular cheek pad 72. A tapered surface 80 adjacent the plug 76 provides clearance for the swiveling of the cheek pad 72.

The cheek pad 72 is a circular narrow elememt defining an axis passing therethrough and having a rounded peripheral surface 84. A raised circular portion 86 of reduced area extends from a larger circular surface formed by the peripheral surface 84. Normal to the cheek pad axis and in facing relation to the clamp 70, the raised circular portion 86 has an annular surface 88.

The diameter of the ball joint socket 78 is slightly less than that of the plug 76 to provide a friction fit. The spherical surface of the socket 78 opens toward a diverging conical surface 90. An inner diameter 92, defined by the intersection of the conical surface 90 with the spherical surface of the socket 78, is less than that of the diameter of the plug 76 to retain the plug 76 within the socket 78. The plug 76, acting as a wedge bearing on the conical surface 90, causes slight forceable expansion of the diameter 92 permitting snap-in insertion.

The clamp 70, slightly tapered toward its opening and of contoured generally rectangular configuration, comprises a pair of facing jaws 94, each being partially extensible for insertion of an eyeglass lens. The clamp 70 has two pairs of facing teeth 96 on the interiors of the facing jaws 94 to grip the lenses of the eyeglass. The dual sets of teeth, and the thereby defined channel regions 98 allow a wide variety of frames to be retained by the clamp 70.

Figure 9:
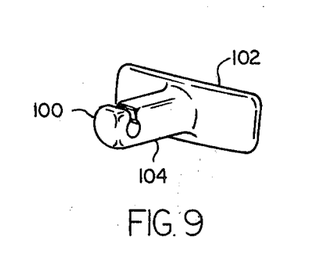
FIG. 9 is a perspective view of another eyeglass support device in accordance with this invention.
Figure 10:
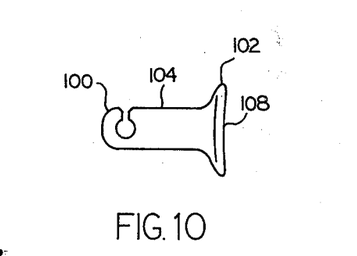
FIG. 10 is a side view of the eyeglass support device depicted in FIG. 9.

FIGS. 9 and 10 depict another example of an eyeglass support unit in accordance with this invention. A clamp 100, a cheek pad 102 and a stem 104 interconnecting the clamp 100 to the cheek pad 102 provide an integral unit. The cheek pad 102 has a concave cheek contacting surface 108 contouring laterally about the stem 104. This allows low cost construction. The eyeglass support units depicted in FIGS. 9 and 10 may be attached to either the right or the left eyeglass lens. As a further feature (not shown), separate right and left eyeglass support devices, each comprising an integral unit, may have cheek contacting surfaces which extend at small obtuse angles to the stems and are disposed central to the lower peripheral region of the right and left lenses respectively, such that each of the cheek contacting surfaces extend outwardly from the central region of the eyeglass. The reaction forces of the cheeks on the cheek pads have centrally directed components.

While the invention has been particularly shown and described with reference to preferred examples thereof, it will be understood by those skilled in the art that various changes in form and details may be made therein without departing from the spirit and scope of the invention.

What is claimed is:

1. A visual aid which substantially avoids physical contact pressure on the nose of the wearer comprising: eyeglasses of the type having a pair of lenses in juxtaposition, each lens defining a lower peripheral region, a bridge interconnecting the lenses and a pair of arms each extending normal to and coupled to outermost portions of each lens, each arm extending rearward for being disposed and bearing on the juncture region connecting the ear and temple of a wearer, and being partially frictionally engaged thereby; and a pair of eyeglass support means joined to the lower peripheral region of each of the lenses for bearing on each cheek of the wearer, each eyeglass support means comprising an eyeglass engaging clamp, a cheek pad and means coupling the eyeglass engaging grip to the cheek pad, such that the substantial gravitational force of the eyeglass when frictionally pivoted about the temple juncture region is vectorially transmitted through the eyeglass engaging clamp to the cheek pads, the cheek pads frictionally engaging the cheeks and providing sufficient reaction force to maintain the eyeglass elevated above and forward of the nose of the wearer at approximately level vertical alignment with the field of vision of the wearer, thereby introducing minimal vertical imbalance in refractive error.

2. The invention as set forth in claim 1 and in which:

each cheek pad comprises an elongated member having a substantial contact area for bearing on the cheek of the wearer, the coefficient of friction of the contact area on a human cheek providing sufficient reaction force to maintain the eyeglass in substantial vertical alignment; and, a stem extending from each cheek pad, each stem including the eyeglass engaging clamp comprises a partially expansible eyeglass receiving jaw for removably grasping the lower peripheral regions defined by the adjacent lenses of the eyeglasses in frictionally restraining and supporting relationship.

3. The invention as set forth in claim 2 and in which the elongated member of one of the cheek pads extends generally laterally toward one eyeglass arm at a small obtuse angle to the stem and the elongated member of the other of the cheek pads extends laterally toward the other eyeglass arm at a small obtuse angle to the stem for providing reaction forces having centrally directed components.

4. The invention as set forth in claim 1 and in which each eyeglass support means comprises first and second generally T-shaped elements, each T-shaped element comprising a crosspiece having a cheek engaging surface and a stem extending from the crosspiece opposite the cheek engaging surface, the crosspiece terminating in the eyeglass engaging clamp, the substantial weight of the eyeglass being transmitted through the stem to the crosspiece and to the cheeks of the wearer, for supporting the bridge of the eyeglass in substantially non-pressure bearing relationship to the nose of the wearer.

5. An eyeglass comprising:

a pair of interconnected lenses in juxtaposition, each lens defining a lower peripheral region, an arm extending adjacent each lens from opposite sides of the lens pair, the arms for positioning along the ears and temples of the wearer in at least partially frictionally restraining relation, the lenses being interconnected by a nose receiving bridge; and a pair of eyeglass support means for extending the eyeglasses forward in substantially non-contacting relationship to the nose of a wearer, while maintaining substantial vertical alignment with the sight of the wearer, each eyeglass support means comprising a frame engaging clamp for at least partially restraining and supporting the lower peripheral region of each of the lenses, and a cheek pad opposite the frame engaging clamp and coupled thereto, the cheek pad defining a cheek contacting surface to support a substantial weight of the eyeglass as transmitted through the frame engaging clamp.

6. The invention as set forth in claim 5 and in which:

the cheek pad comprises bearing means for retaining a cylindrical rod; and the clamp comprises a partially extensible universal frame restraining jaw; and in which the support means further comprises means disposed within the bearing means and coupled to the clamp to pivotally couple the cheek pad to the clamp.

7. The invention as set forth in claim 5 and in which the cheek pad comprises a narrow element having a ball joint retaining socket therein, and the frame engaging clamp comprises a partially extensible frame restraining jaw and the support means comprising a substantially spherical ball joint plug being coupled to the clamp; the ball joint plug disposed within the ball joint socket of the cheek pad to allow adjustment of the cheek pad to conform to the contour of the cheeks of the wearer, thereby providing a maximum reaction force surface.

8. The invention as set forth in claim 5 and in which a threaded portion being coupled to the cheek pad extends opposite the cheek contacting surface, the frame engaging clamp having a threaded aperture, and the threaded portion mating with the threaded aperture of the frame engaging clamp to provide adjustment of the distance between the lower peripheral regions of the eyeglass and the cheekbones of the wearer.

9. A device for supporting an eyeglass in a substantially non-pressure bearing relationship to the nose of the wearer, the eyeglass being of the type comprising a pair of lenses interconnected in juxtaposition and an arm extending normal to each of the lenses for bearing on the juncture between the ear and temple of the wearer, the device maintaining the eyeglass in substantial vertical alignment with the line of vision of the wearer, comprising:

a universal eyeglass frame engaging clamp for supporting in frictionally restraining and detachable relationship, the lower peripheral region of an eyeglass;

a cheek pad having a contact area for frictionally engaging the cheek sufficiently to avoid slippage; and means coupling the eyeglass frame engaging clamp to the cheek pad to transmit reaction forces from the cheek on the cheek pad to the bottom periphery of the eyeglass through the clamp, the device advancing the nominal anterior position of the eyeglass arms and interconnected lens pair without materially altering the vertical nominal position of the eyeglass on the wearer to minimize vertical imbalance in refractive error.

10. The invention as set forth in claim 9 and in which the eyeglass frame engaging clamp comprises an at least partially flexible jaw having an inwardly directed tooth extending over and partially enclosing in restraining and removable relationship a portion of a rim affixed about the perimeter of the lenses to provide a universal eyeglass rim attachment.

11. The invention as set forth in claim 9 and in which the device comprises a T-shaped element having a crosspiece including the cheek pad, the cheek pad comprising an elongated contoured area, and a stem extending normal to the crosspiece opposite the elongated contoured area, the stem comprising the frame engaging clamp and transmuting laterally directed reaction forces to vertically directed forces on the eyeglass.

12. The invention as set forth in claim 9 and comprising an elongated threaded member coupled in extending relation to the cheek pad, the clamp comprising a threaded aperture, the threaded member mating with the threaded aperture, thereby providing an adjustment of the distance between the eyeglass and the cheekbone of the wearer; and the cheek pad having a convex contoured cushion opposite the threaded portion for substantially conforming to the cheekbone of the wearer while maintaining sufficient contact to support the eyeglass bridge in non-contacting relationship with respect to the nose of the wearer.

13. A device for supporting eyeglasses to substantially relieve the weight of the eyeglass from the nose of the wearer without introducing a material imbalance in refractive error comprising:

an eyeglass frame engaging clamp for grasping in a frictionally restraining and removable relationship, the lower peripheral region of an eyeglass lens, the clamp having inwardly directed teeth for universally grasping the lower peripheral rim of the eyeglass;

a cheek pad disposed to bear against the cheek surface of the wearer having a contact area for exerting frictional reaction forces thereon, the cheek pad being at least partially pivotal with respect to the clamp to conform to the contour of the cheek of the wearer; and means coupling the clamp to the cheek pad, the device transmitting frictional and reaction forces on the cheek pad to primarily upwardly directed forces on the eyeglass.

14. The invention as set forth in claim 13 and in which:

the clamp comprises a jaw having first and second pairs of inwardly directed teeth for universally gripping a variety of eyeglass frames; and the cheek pad coupling means comprises a stem extending from the clamp and terminating in a substantially spherical plug, the cheek pad comprising a ball joint socket, the ball joint socket retaining the spherical plug in at least partially swivelable relationship.

15. The invention as set forth in claim 13 and in which the cheek pad comprises a partially enclosed cylindrical channel, the means coupling the clamp to the cheek pad comprises a T-bar element having a threaded portion and a cylindrical rod substantially normal to the threaded portion, the cylindrical rod being disposed within the channel defining an axis passing therethrough, the clamp having a threaded aperture, and the threaded portion mating with the threaded aperture, thereby providing adjustment of cheek pad to eyeglass distance and pivoting of the cheek pad about the axis of the rod to conform to the cheekbone contact area of a wearer.

16. An eyeglass support device for maintaining an eyeglass in a substantially non-pressure bearing relationship to the nose of the wearer and in a nominal plane substantially parallel to and in vertical alignment with the line of vision of the wearer comprising:

a universal eyeglass frame engaging clamp couplable in frictionally restraining and detachable relationship with the lower peripheral region of an eyeglass and including a stem receiving means;

a cheek pad member including means for frictionally engaging the cheek and bearing means for pivotably retaining a cylindrical element; and a T-bar coupling the cheek pad to the clamp, the T-bar comprising a base stem having a central axis, the stem being adjustably mounted in the stem receiving means and a cylindrical crosspiece rod defining an axis of rotation along the length thereof and disposed in the bearing means, the crosspiece rod extending proximate the cheek and supporting the cheek pad member, the means for frictionally engaging the cheek being in facing relation to the cheek such that the cheek pad member may be pivotally adjusted relative to the eyeglass and the base stem may be adjusted relative to the clamp so that the nominal distance and the angle between the cheek pad frictional engaging means and the nominal plane of the eyeglass are variable to allow for differences in size and shape of particular eyeglasses with respect to the wearer's facial features.

17. The invention as set forth in claim 16 and in which the means for adjustably receiving a stem element comprises a threaded aperture and the stem is threaded to mate with the threaded aperture.

18. The invention as set forth in claim 16, and in which the bearing means for retaining a cylindrical element comprises a pair of facing elongated rounded concave surfaces disposed substantially normal to the stem, the cheek pad defining a diametral axis, the bearing means being disposed eccentric and parallel to the diametral axis to allow enhanced variation of the placement of the cheek pad relative to the wearer's cheek.

19. The invention as set forth in claim 16 and in which the cheek pad, when normal to the stem, defines a nominal tangential cheek contact plane disposed at an angle of approximately 30° with respect to the nominal plane defined by the eyeglass frame engaging clamp.

20. An eyeglass support device for maintaining an eyeglass in a substantially non-pressure bearing relationship to the nose of the wearer and in a nominal plane substantially parallel to and in vertical alignment with the line of vision of the wearer comprising:

a universal eyeglass frame engaging clamp couplable in frictionally restraining and detachable relationship with the lower peripheral region of an eyeglass and including stem receiving means;

a cheek pad member including means for frictionally engaging the cheek and a bearing aperture for pivotably retaining a cylindrical element;

a T-bar coupling the cheek pad to the clamp, the T-bar comprising a base stem having a central axis, the stem being adjustably mounted in the stem receiving means and a cylindrical crosspiece rod defining an axis of rotation along the length thereof and disposed in the bearing aperture, the crosspiece rod extending proximate the cheek and supporting the cheek pad member, the means for frictionally engaging the cheek being in facing relation to the cheek such that the cheek pad member may be pivotally adjusted relative to the eyeglass and the base stem may be adjusted relative to the clamp so that the nominal distance and the angle between the cheek pad frictional engaging means and the nominal plane of the eyeglass are variable to allow for differences in size and shape of particular eyeglasses with respect to a wearer's facial features;

the cheek pad comprising a disk portion and a raised boss extending therefrom, the bearing aperture being substantially disposed in the raised boss and comprises a pair of facing elongated rounded concave surfaces, the bearing aperture being substantially normal to the stem of the T-bar, the T-bar comprising a narrowed portion on the base stem adjacent the rod to allow pivotal clearance of the rod within the bearing aperture of the cheek pad;

the clamp comprising an extensible jaw adjacent the cheek pad of resiliently deformable material and a primarily fixed jaw further from the cheek pad, each jaw having a substantially rounded eyeglass engaging surface for gripping the lower peripheral region of an eyeglass and for forcibly extending primarily the extensible jaw in wedging relationship by an eyeglass rim, the fixed and extensible jaws defining a channel therebetween for engaging an eyeglass rim, the base stem of the T-bar comprising threads and the substantially fixed jaw having a threaded aperture adjustably mating with the threads, the stem having an end portion defining a perimeter and the extensible jaw having a stem receiving aperture larger than the end portion perimeter, the aperture being substantially coaxial with the threaded aperture and expanding inwardly adjacent to the channel region to receive the end of the stem extending through the primarily fixed jaw without interference; and the cheek pad further comprising a pad adhering to the disk portion of the cheek pad opposite the bearing means to assume the shape of the wearer's cheek, providing substantial frictional contact area, the device thereby providing a universally adjustable eyeglass support.

21. The invention as set forth in claim 20 and in which:

the fixed jaw comprises a pair of overlapping U-shaped cavities, each having threaded round portions and lateral sides, the cavities being disposed in parallel adjacent one another and being transversely disposed on the fixed jaw, the threaded round portions of the cavities being coaxial and defining the threaded aperture, the lateral sides of the U-shaped cavities opening to opposite sides of the fixed jaw, thereby allowing die removal normal to a single molding axis during fabrication; and in which the stem receiving aperture having a transverse width only slightly greater than the stem to maintain the stem in substantial alignment in the threaded aperture.

22. The invention as set forth in claim 21 and in which:

the extensible jaw comprises a second pair of overlapping U-shaped cavities, each having round portions and lateral sides, the second pair of cavities being disposed in parallel adjacent one another and transversely disposed on the extensible jaw, the round portions of the second pair of cavities being coaxial and defining the stem receiving aperture, the lateral sides of the second pair of U-shaped cavities opening to opposite sides of the extensible jaw, thereby allowing die removal normal to a single molding axis during fabrication.

23. The invention as set forth in claim 20 and in which the disk portion of the cheek pad comprises a plurality of peripheral teeth for manually rotating the cheek pad and the cheek pad comprises means indicating the rotational position of the cheek pad with respect to the clamp to allow the wearer to adjust the cheek pad to a desired setting for comfort.

24. The invention as set forth in claim 20 and in which the disk portion comprises a low profile spherical contoured surface opposite the raised boss, the adhering pad being disposed over in conformity to and substantially extensibly with the spherical contoured surface for comfort to the wearer.

* * * * *

UNITED STATES PATENT OFFICE
CERTIFICATE OF CORRECTION

Patent No. 3,955,885　　　　　　　　　Dated May 11, 1976

Inventor(s) Richard B. Aronsohn

It is certified that error appears in the above-identified patent and that said Letters Patent are hereby corrected as shown below:

Column 6, line 9, "elememt" should read --element--. Column 8, line 17, after "plug" and before "coupled", strike "being"; line 18, after "plug" and before "disposed" insert --being--.

Signed and Sealed this

Thirty-first Day of August 1976

[SEAL]

*Attest:*

RUTH C. MASON
*Attesting Officer*

C. MARSHALL DANN
*Commissioner of Patents and Trademarks*